United States Patent [19]

Braitberg et al.

[11] Patent Number: 5,333,177
[45] Date of Patent: Jul. 26, 1994

[54] UNIVERSAL CONNECTION FOR CELLULAR TELEPHONE INTERFACE

[75] Inventors: Michael F. Braitberg; Patrick J. Kennedy, both of Boulder, Colo.; Hiroshi Sakurai, Tokyo, Japan

[73] Assignee: Cell Port Labs, Inc., Boulder, Colo.

[21] Appl. No.: 773,840

[22] Filed: Oct. 19, 1991

[51] Int. Cl.⁵ ............................................. H04M 11/00
[52] U.S. Cl. ........................................ 379/59; 379/58; 379/441
[58] Field of Search ................. 379/58, 59, 63, 397, 379/441, 442; 455/89, 90

[56] References Cited

U.S. PATENT DOCUMENTS

| | | |
|---|---|---|
| 4,607,170 | 8/1986 | Wickman . |
| 4,622,633 | 11/1986 | Ceccon et al. . |
| 4,672,570 | 6/1987 | Benken . |
| 4,694,421 | 9/1987 | Ogawa . |
| 4,718,080 | 1/1988 | Serrano et al. ............... 379/59 |
| 4,792,986 | 12/1988 | Garner et al. ............... 455/89 |
| 4,991,085 | 2/1991 | Pleva et al. . |
| 5,081,667 | 1/1992 | Drori et al. ............... 379/59 |
| 5,127,041 | 6/1992 | O'Sullivan ............... 379/63 |

OTHER PUBLICATIONS

Morrison A. Dempsey Communications, "AB3X Cellular Interface" Owner's Manual, Nov. 1987, 30 pages.

Primary Examiner—Curtis Kuntz
Assistant Examiner—Dwayne D. Bost
Attorney, Agent, or Firm—Sheridan Ross & McIntosh

[57] ABSTRACT

A cellular telephone is interconnected to a control unit via a cable. The cable contains both appropriate interdisciplinary connections for attachment to the telephone at one end and to the control unit at the other end via a universal connector. At least one contact of the universal connector is capable of producing a signal coded to identify the type of cellular telephone attached to the connector at the other end. A decoder at the control unit identifies the type of phone as by table look-up and establishes appropriate interfacing operational functions at its universal connector to properly operate with the telephone. Accordingly the control unit can function with any of a wide variety of cellular telephones having differently configured cable connections and cable connector disciplines of contact assignments.

9 Claims, 4 Drawing Sheets

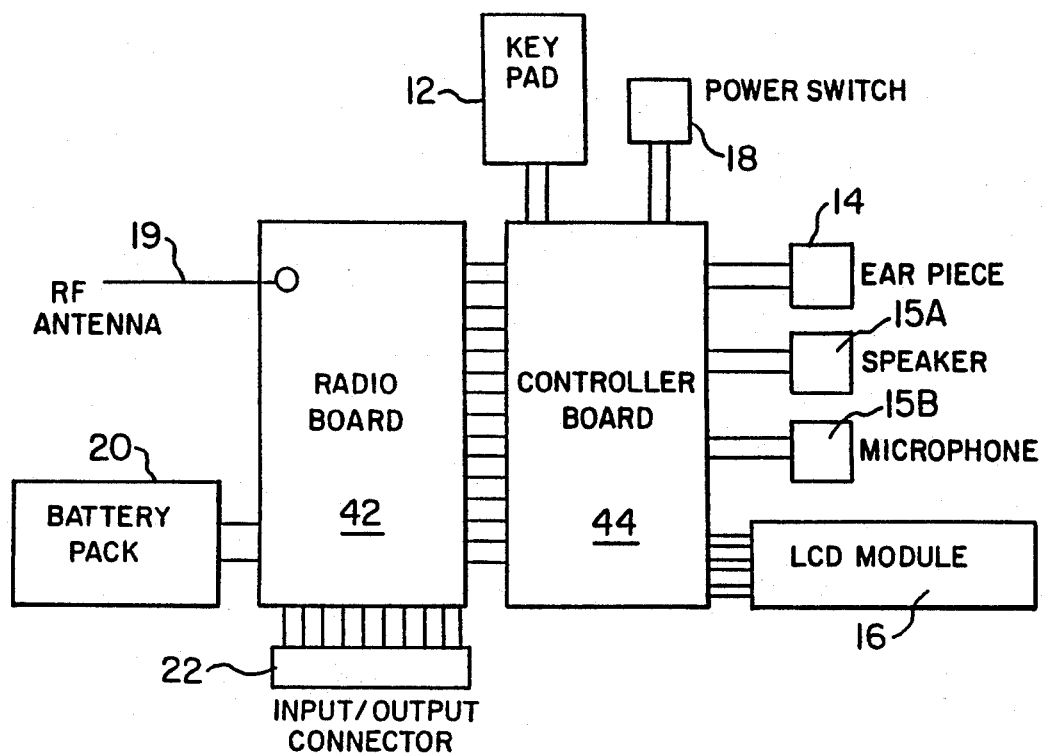
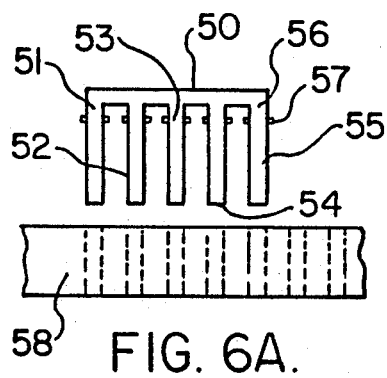
FIG. 6A.
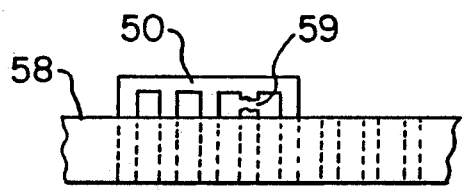
FIG. 6C.
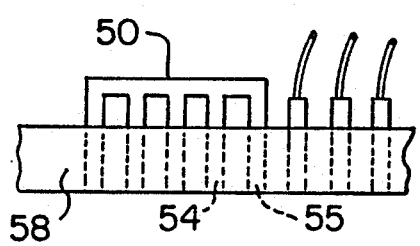
FIG. 6B.
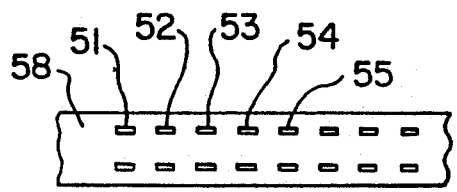
FIG. 6D.
FIG. 5.
PRIOR ART ns to a common base unit. The
UNIVERSAL CONNECTION FOR CELLULAR TELEPHONE INTERFACE

BACKGROUND OF THE INVENTION

1. Field of the Invention

The present invention relates to cellular telephone interfacing systems and processes. More particularly, the present invention relates to multiconductor cables for attaching a hand-held cellular telephone from any of a variety of such telephones to a common base unit. The present invention further relates to apparatus and methods for recognizing the type of cellular telephone attached to the connection and for conforming the supporting interface to accommodate the same.

2. Description of the Prior Art

Cellular telephone systems have gained widespread acceptance as an efficient means of mobile voice and data communications. While early mobile units were large and complex, miniaturization has made possible hand-held units with full functional capabilities allowing the user freedom to use the phone unit without connection to the vehicle. Unfortunately, this miniaturization has made hand-held units less practical for vehicular use. For example, battery charging, remote antenna connections, voice and data communications, and most importantly, what is known as "hands free" operation require physical connection to the phone unit.

To solve this problem cellular phone manufacturers have made available car kits to provide the required features. These kits include physical hardware to retain the phone in the vehicle including an attachment for establishing an electrical connection to the phone and various types of remote speakers, microphones and antenna connections. These kits also include complex electronics modules to provide battery charging, audio amplification and digital communication interface to the phone unit.

There are a large number of models of cellular telephones in existence and each physical interconnection and electrical interface is unique to a manufacturers specific model. There are many examples of presently used physical interconnections. As a result, car kits do not provide any form of universal connection and are neither physically nor electrically interchangeable. Further, because of the large variety and relatively low volume production of these kits, users are forced to pay prices comparable to the much more complex phone unit itself to obtain these kits.

This situation has caused a hardship on cellular telephone users and affected the marketplace for new equipment. Fleet users, for example, cannot provide a universal car kit connection for the variety of phones they may acquire. Users are forced to abandon their investment in the car kit when purchasing new models of telephones. These limitations have prevented businesses such as car rental agencies from providing users with means to use their car phones in rented vehicles. Further, the high cost of these car kits has caused many users to operate hand-held units while driving, an unsafe condition which is subject to increasing governmental concern and regulation.

SUMMARY OF THE INVENTION

One object of the present invention is to provide a universal physical and electrical connection to a plurality of different kinds of hand-held cellular telephone units. A selectable adapter cable coding permits determination of the unique identity of the type of attached phone thereby allowing a data processing unit or the like to establish appropriate electrical interfacing support operations. A further purpose of the invention is to provide means to interface with a large number of hand-held and portable phones to achieve low cost electrical adapters that are useful with many makes and models of phones.

The present invention is described below for the detailed descriptions of the embodiment with emphasis upon the automobile applications and environments. However the invention is not restricted to the automobile environment but is well suited for use in any type of environment including all types of vehicles, tractors, boats or airplanes as well as in buildings and anywhere portable units are operational.

The apparatus of this invention provides a universal interface with a cable having on a first end a multiple contact connector of a predetermined number of connectors in a predetermined configuration and contact assignment discipline. At least one of the first end connectors is adapted for presenting a coded signal. That signal coding identifies at least the type of cellular phone attached to the connector on the opposite end of the cable. An arrangement is coupled to the coded signal connector for determining the type of cellular phone attached to the opposite end connector of the cable. Once the phone identification is determined, the system enables the cable first end connector contacts for performing functional operations with the cellular telephone attached to the cable.

The coded signal correlates to the identity of a particular type of cellular telephone. Information for controlling the cable first end connector for functionally operating with a particular one of a plurality of cellular telephones is retrievably stored as a multiplicity of information groups. Each such group is selectable in accordance with the coded signal. This makes it possible to respond to a received coded signal for selecting the the information group identified thereby from storage and for using that group to enable appropriate interfacing with the cellular telephone through the cable connectors.

The method of this invention is to provide universal interfacing with a cable that has on its first end a multiple contact connector of a predetermined number of connectors in a predetermined configuration with at least one of the first end connectors adapted for presenting a coded signal. The cable also has a connector on the opposite end of the cable adapted for attachment to a cellular telephone. The coded signal is sensed at the cable first end connector. This makes it possible to determine the type of cellular phone attached to the opposite end connector of the cable. The latter step makes it possible to enable the cable first end connector contacts for performing functional operations with the cellular telephone attached to other end of the machine.

A cable pursuant to this invention is configured to attach to a control unit having a connector input therefor arrayed in accordance with a first discipline specified for the universal connector. The control unit is designed to interface with a cellular telephone which has a connector having a plurality of electrical contacts arrayed in a second discipline which may differ significantly from the first discipline. The intent of the interfacing cable is to establish an operative connection of the control unit to a particular type of cellular telephone having a connector of the second discipline.

For this purpose, a connector on one end of the cable has a plurality of electrical contacts thereon arrayed in accordance with the aforesaid first discipline. A second connector is attached to the opposite end of the cable with a plurality of electrical conductors interconnecting respective contacts of the first connector with corresponding contacts in accordance with common functions between the first and second disciplines. A coded signal is established using one or more of the contacts of the first discipline connector to identify the type of cellular telephone attached to the second discipline connector.

Apparatus in accordance with this invention for providing a universal interface with a hand held cellular telephone can include a cable with first and second connectors. The first connector is attached to one end of the cable and includes contacts for the production of battery charging power as well as for exchanging radio frequency, audio and digital signals. It can also include structure to identify the make and model of the cellular telephone independently of that telephone. The second connector is attached to the opposite end of the cable. It includes contacts for allowing attachment to a predetermined one of a plurality of different types of cellular telephone units. The cable further includes a plurality of conductors which interconnect the first and second connector contacts that have common or corresponding functions. As a result, a universal interface is establishable between an electronics module which provides signal processing features with a predetermined cellular telephone amongst the variety of different cellular telephones that are available.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 5 is a block diagram of a typical hand-held cellular phone unit.

FIGS. 6A to 6D illustrate one method of embodying a coded adapter cable connector in accordance with this invention.

FIG. 10 shows a configuration of a cable connector mounting suitable for attachment to a panel, dashboard, bulkhead or the like.

DETAILED DESCRIPTION OF THE PREFERRED EMBODIMENTS

Figure 1:
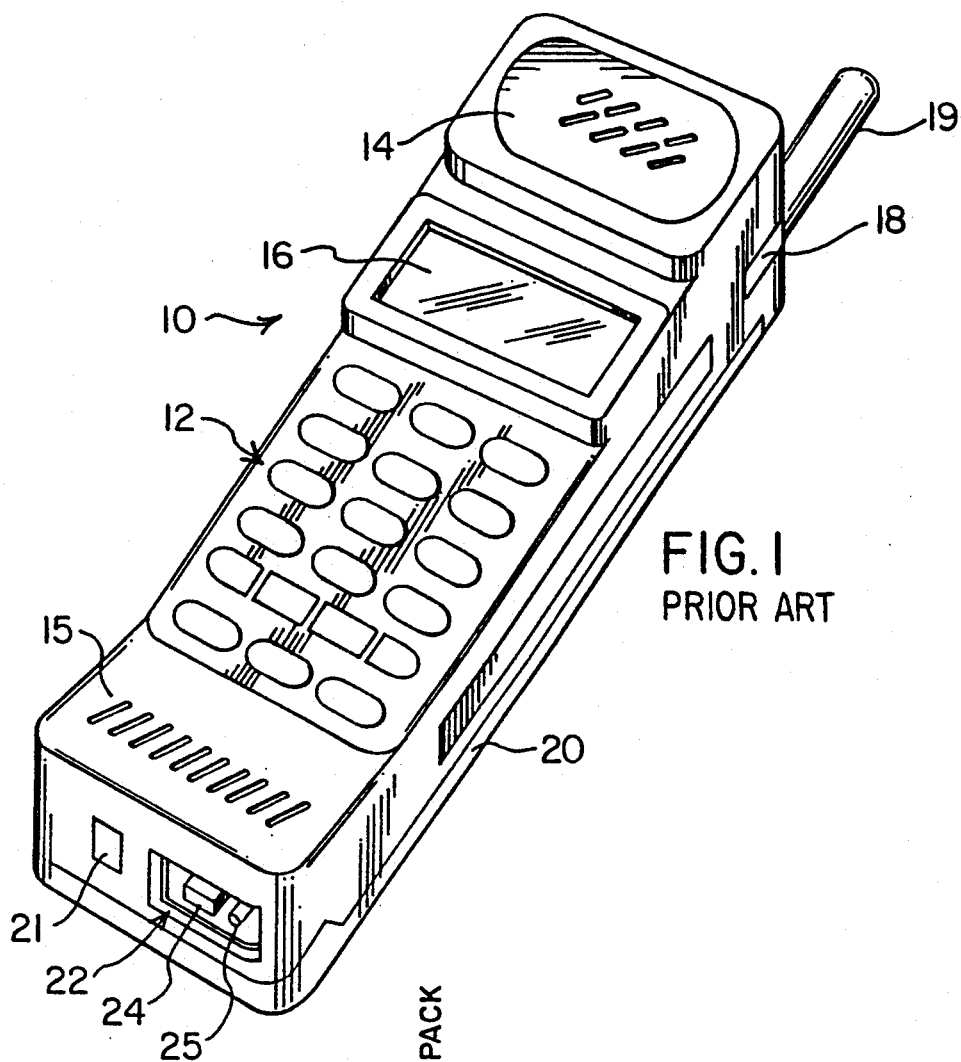
FIG. 1 shows a contemporary cellular telephone and its interconnection port.

Hand-held cellular telephones, such as unit 10 illustrated in FIG. 1, employ a wide variety of physical interfaces. There are a large number of models of cellular telephones in existence and each physical interconnection and electrical interface is unique to a manufacturers specific model.

Cellular phone 10 includes a typical array of features for such devices. Keypad 12 allows dialing and other data processing/generating functions. An earphone 14 is positioned at one end while a microphone/speaker 15 is located at the other end. Liquid crystal display (LCD) 16 provides a compact presentation of limited information to the user while switch 18 is for on/off control. Antenna 19 communicates with the base unit for the phone 10 when it is removed from its holder. A battery pack 20 is attached to the lower portion of phone 10 and requires periodic recharging when unit 10 is placed in the base unit (not shown). It is released for detachment by manual button 21.

Interconnections with the base unit are established by a plug 22 at one end of unit 10. The particular connector of FIG. 1 is a male connection with a center extension 24 having arrays of electrical contacts on the upper and lower surfaces thereof. Additionally, an RF coaxial type element 25 is included as a portion of plug 22. Note that not every cellular telephone has an RF connector even though one is included in the example shown as element 25. In conventional use, unit 10 is stored in the base unit so as to couple plug 22 with a complementary connector in the base unit.

FIGS. 2A through 2F show a series of examples of presently used physical interconnections for cellular telephones. That is, FIG. 2A to 2F present typical examples of cylindrical, rectangular, spring contact and pad type connections used in common cellular phone units, usually in the base plate thereof. From this it is apparent the wide range of configurations and physical sizes prohibits a common interconnection to a base unit or the like. Such phones are expected to use even smaller connectors as the units are further miniaturized in the future.

Figure 3:
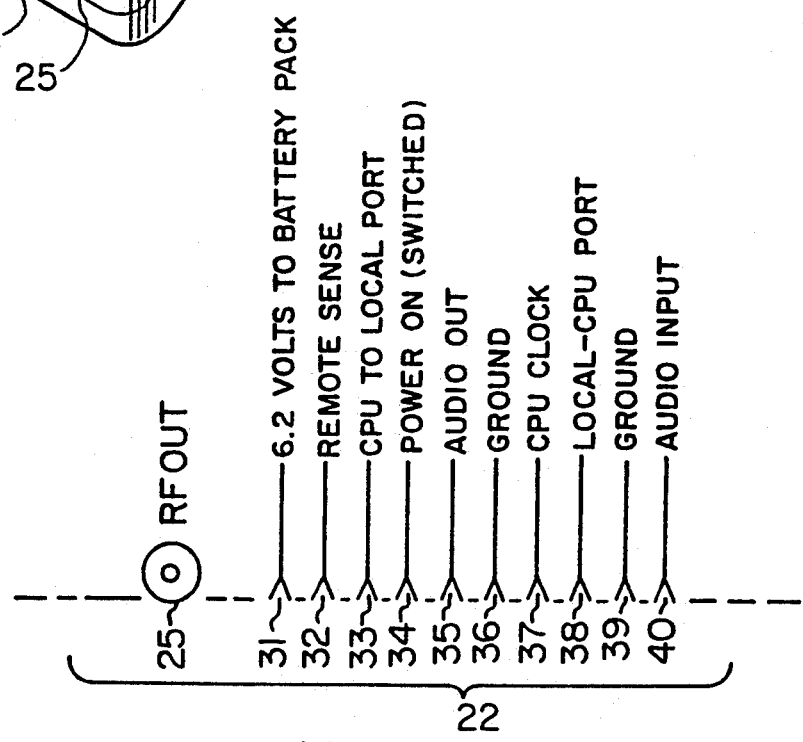
FIG. 3 is a tabulation of the electrical functions associated with a typical input/output connector for a contemporary cellular telephone.
Figure 2A:
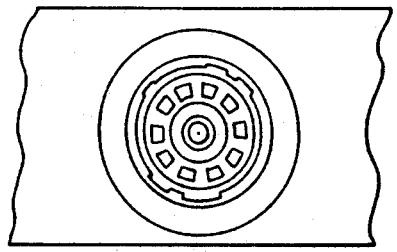
FIGS. 2A to 2F show examples of a variety of hand-held cellular telephone input/output physical interfaces.
Figure 2D:
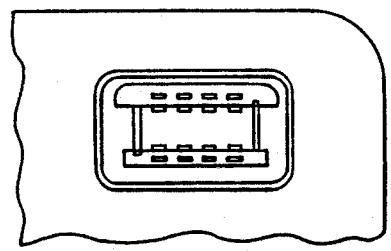
Figure 2B:
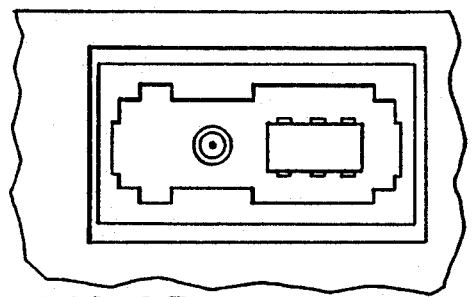
Figure 2E:
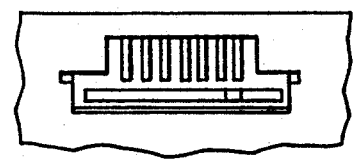
Figure 2C:
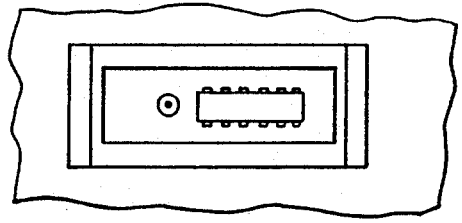
Figure 2F:
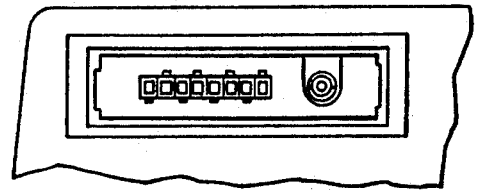

Electrical interfaces to the various phone units present still more problems. For instance, there is a wide variety of battery types and voltages used in the rechargeable battery packs incorporated into the phone units. Further, the electrical phone signals exist in a wide variety of voltage levels and signal coding schemes. A typical example of the functions assigned to the pins of a conventional phone input/output connector 22 containing connector contacts or pins 31–40 is shown in FIG. 3. Note that connector 22 of FIG. 3 might or might not represent the specific pin function assignments for connector 22 shown in FIG. 1. While there is a certain amount of commonality of functions associated with many cellular phones, the particular function assigned to a given pin often varies as does the number of functions, the number of pins and their physical configurations.

Connector 22 is shown with a coaxial connector 25 to provide for direct connection to the RF output. Pin 31 is used for battery charging from the remote adapter, while pin 32 is used to detect the presence of the remote adapter and pin 33 is used for digital communication to the remote adapter. Pin 34 is used to signal the remote adapter that phone power is on. Pin 35 has the low level audio output signal to drive a remote speaker amplifier. Pins 36 and 39 provide internal ground connections. Pin 37 provides the CPU clock signal, pin 38 is the local to CPU communications port, and pin 40 is used to receive the signal from the remote microphone.

The internal architecture of a typical phone unit is shown in block diagram form in FIG. 5 where further details of the interconnections with the internal block functions of the phone with the input/output connector 22 described above are presented. The peripheral elements of FIG. 5 correspond to their counterparts of FIG. 1. Note that the speaker 15A is separate from the microphone 15B but both are housed at that end of unit 10. This is to prevent production of the ringing sound directly into the ear of the user. Radio board 42 contains the radio frequency signal handling components whereas a computer including a conventional CPU with its input/output interfaces is contained in board 44. The CPU of board 44 handles all the host functions associated with the components shown.

It is possible to create a custom tailored adapter cable configured internally to transpose connections between the various interconnection disciplines along the lines of those shown in FIGS. 2. The present invention in part contemplates creation of an adapter cable with a universal interface as a common connector at one end but with that cable provided with a suitable connector at the other end to attach to a particular connector configured to another contact assignment discipline. To accomplish this goal, two problems are solved. First, a suitable connector is designed so that any phone unit is accommodated regardless of electrical interface. Second, means are provided to determine exactly what phone unit is connected to the adapter cable so that the electronic interface can properly adapt to that phone.

A suitable connector must meet several conflicting requirements. An acceptable connector system must be low cost, allow a variety of mounting arrangements and have characteristics suitable for its intended operating environment such as for use not only in automobiles but also in vehicles, boats, tractors, residences, and so forth. Often the operating environment demands shielding of the cable and connector as protection against interference with other equipment that is interference signal sensitive as well as to protect the phone system from interference signals. Such a connector and adapter cable system is shown in FIG. 4 and described below.

A universal connector or plug 45 is arranged in accordance with a predetermined assignment of pin functions. On the opposite end of cable 46 is a connector or plug 48 configured to attach to a particular cellular phone such as one of those illustrated in FIGS. 2A-2F. The conductors within cable 46 are connected within plugs 45 and 48 so that the pin functions are matched. As is likewise described in greater detail below, connector 45 can include an arrangement for providing a signal to the using device attached to plug 45 wherein the signal is encoded to identify the kind of cellular phone plugged into connector 48 at the other end of cable 46.

Figure 9:
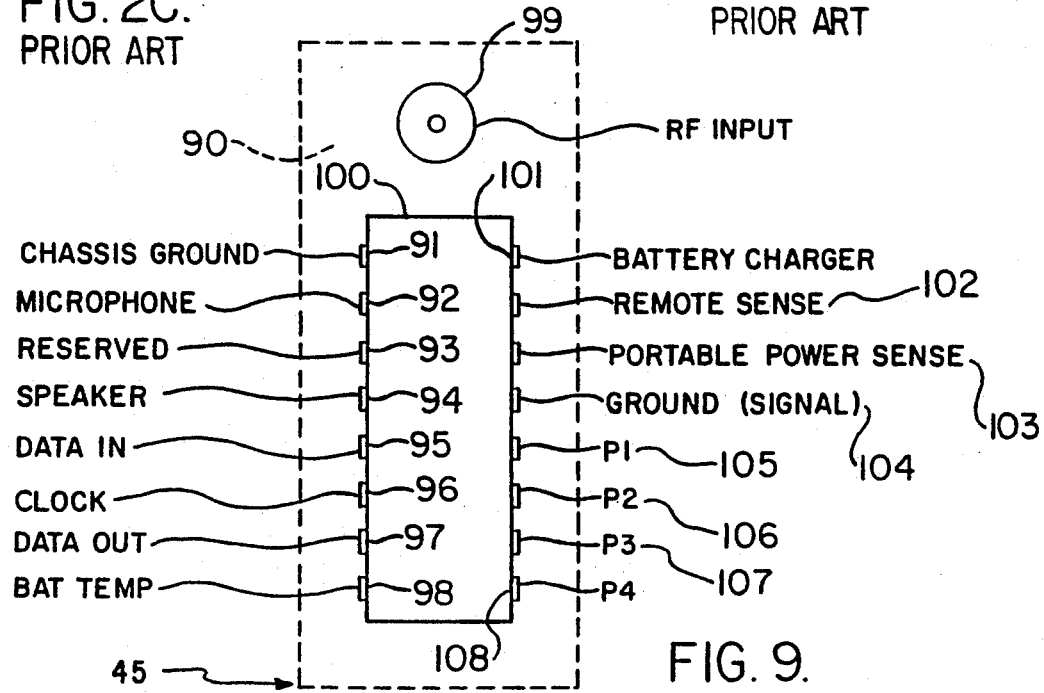
FIG. 9 is a tabulation of an exemplary connection assignment discipline for use in conjunction with the present invention.
Figure 4:
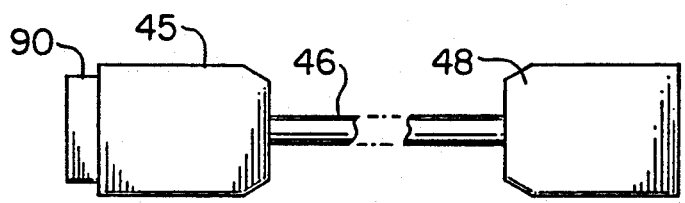
FIGS. 4 is an exemplary embodiment of an adapter cable in accordance with the present invention.

One example of a suitable connector for providing a standard interface connection as for the FIG. 4 cable is illustrated in FIG. 9. This connector is preferably panel mounted and consists of a protective hood 90 protecting a rectangular center block 100 of insulating material with parallel rows of contacts. Each row preferably has eight gold plated, substantially flat contacts 91-98 and 101-108. These contacts are formed slightly convex in order to create miniature leaf springs which provide pressure with the contacts of the mating connector. Thus the interface to the mating connectors is such that they are self-cleaning by means of the self wiping action during insertion. This is an especially important consideration in automobile applications.

Note that, if desired, hood 90 could provide a shield against outside signals interfering with the cable signals or, conversely, against signals in cable 46 from interfering with other equipments. This is possible by electrically connecting hood 90 to a sleeve type RF shield encasing the main body of cable 46 and a similar shielding hood at the opposite end connector 48.

The contact pins 91-98 and 101-108 are arrayed along each side of block 100 with the tubular, coaxial radio frequency (RF) connector 99 located in spaced relation towards one end. A typical such connector 99 is 0.10 inches in diameter with low standing wave ratio at frequencies of 800 to 900 MHz suitable for attachment to a coaxial cable. Connections to the contacts are conventional as by soldering, crimping or the like. The center block 100 and RF connector 99 are recessed in a rectangular shell 90 to provide protection from physical damage. The mating connector has the same characteristics with the housing designed to provide protection cable strain relief and a locking mechanism to provide secure engagement but allow easy removal.

Assuming connector 45 of FIG. 4 is arranged in accordance with FIG. 9 whereas connector 48 on the opposite end of cable 46 is configured pursuant to the FIG. 3 discipline, the conductors through cable 46 would interconnect the pins at each plug which have comparable functions. A coaxial cable would thus couple RF plug 25 with RF plug 99. Conductors would also interconnect battery pin 31 with charger pin 101, both pins 36 and 39 with ground pin 91, clock pin 37 with pin 96, pin 35 with pin 92, and pin 40 with pin 94. Further, pin 34 is connected with pin 103 while pin 32 is interconnected with pin 102. Finally pin 33 is coupled to pin 97 while pin 38 goes to pin 95 as does pin 35.

If one of the grounds at pins 36 and 39 of FIG. 3 are signal grounds rather than chassis grounds, that particular pin might connect with pin 104. In the standard established by FIG. 9, pins 105-108 identified as P1-P4 are employed for device identification purposes as is described in detail in FIGS. 6, 7 and 8. Note that the FIG. 9 connector has a battery temperature sensor input terminal 98. This is to accommodate cellular phones that include such a sensor output even though the FIG. 3 connector does not include this function. When the control device attached to plug 45 senses the model type identification from terminals 105-108, it would realize that the phone model involved here does not have a battery temperature sensing signal and would ignore pin 98. Otherwise the controller adjusts its interconnections and support functioning for terminals 91-98 and 101-104 to fully cooperate with the phone connected via appropriate conductors to the other end of the cable from connector 45.

Figure 10:
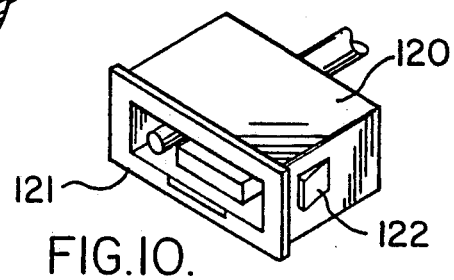

FIG. 10 shows connector 120, a snap-in bulkhead mounting version, that mates with the adapter cable. Installed from the front of the panel in a rectangular cut out, a trim bezel 121 forms a front panel mounting surface. As is common practice, molded clips such as 122 allow easy insertion but expand and lock against the rear surface of the panel retaining the connector body while accommodating a range of panel thickness. This and the following version are useful for original equipment automobile installation.

Figure 11:
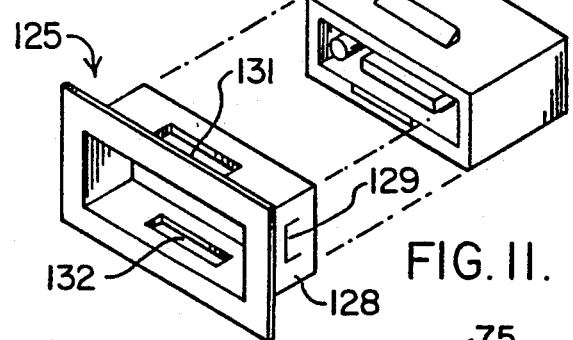
FIG. 11 is another configuration of a cable connector mounting suitable for a panel type attachment.

Assembly 125 of FIG. 11 is somewhat similar to FIG. 10 but is designed for either front or rear insertion of connector 126. For example, a bezel assembly 128 includes snap-mount retaining clips such as 129 to hold assembly 128 in a panel opening similar to the FIG. 10 clips as described above. Assembly 128 acts as a receiver for connector body 126 which in this example has snap tongues such as 130 on the upper and lower surfaces which engage respective slots such as slots 131 and 132 in the bezel assembly 128. Rear mounting is desirable in some cases where the cable is permanently affixed to an electronics module for example. Many variations of this and the previous mounting method are possible to provide easier installation and lower product cost. For instance, it is possible to integrate the bezel with the dashboard fascia molding eliminating or modifying elements of the mounting method.

Figure 12:
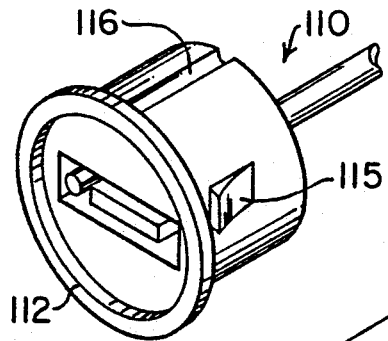
FIG. 12 is an arrangement for a cable connector mounting as a replacement for a vehicle cigarette lighter.

FIG. 12 illustrates a connector 110 that mates with the adapter cable. This version resides in a housing 112 designed in a manner identical to the common automotive cigarette lighter assembly which is approximately ⅞ inches in diameter. It can include means to secure it to the panel such as retaining tabs 115 and a locating groove 116 especially if it is removable. Installation is by replacing the existing lighter assembly without requiring permanent modification to the vehicle. If necessary the original lighter assembly can be re-installed at some future time to restore the vehicles to its original condition. This version is useful in an aftermarket installation kit.

Figure 13:
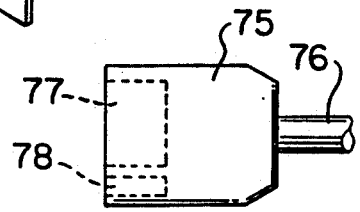
FIG. 13 is an illustration of a female connector for adapting the FIG. 4 cable as an extension.

FIG. 13 is a mating cable end to the adapter cable used when it is desired to provide an extension cable or to allow a variety of mounting methods which may attach directly to the connector or cable body. That is, connector 75 is attached to cable 76 which corresponds to cable 46 of FIG. 4. The connector on the other end of cable 76, although not shown in FIG. 13, is the same as connector 45 of FIG. 4. Receiving female connector elements 77 and 78 are thus compatible with attachment to a male connector constructed the same as plug 45.

One embodiment for determining the make and model of the phone employs a cable adapter to identify itself to the electronics module or host assembly 150. This is accomplished in the FIG. 6A-6D configuration by a number of pins reserved at the processor or common end of the cable connector for use as a programming device. An electrically conductive structure 50 containing a plurality of physically and electrically interconnected pins 51-55 is inserted into and retained by connector body 58 as seen in FIG. 6B. A short connecting link 56 extends above ridge or shoulder 57 above the connector body 58 when connector 50 is inserted therein. These links are preferably clipped in a binary pattern to produce the identification data for the processor 154 so that it can determine the type of cellular phone attached to the other end of the cable.

For example, if link 54 is clipped as shown as gap 59 in FIG. 6C, the resulting circuit to pin 54 is opened. Thus electrical current sensing of the pins 51-55 in FIG. 6D will reflect the open circuit status of pin 54. The connector body 58 includes conventional, well-known means (not shown) for retaining the end of the clipped contact in place so as to prevent it from falling out or sliding back into the connector body when the connectors are coupled.

Figure 7:
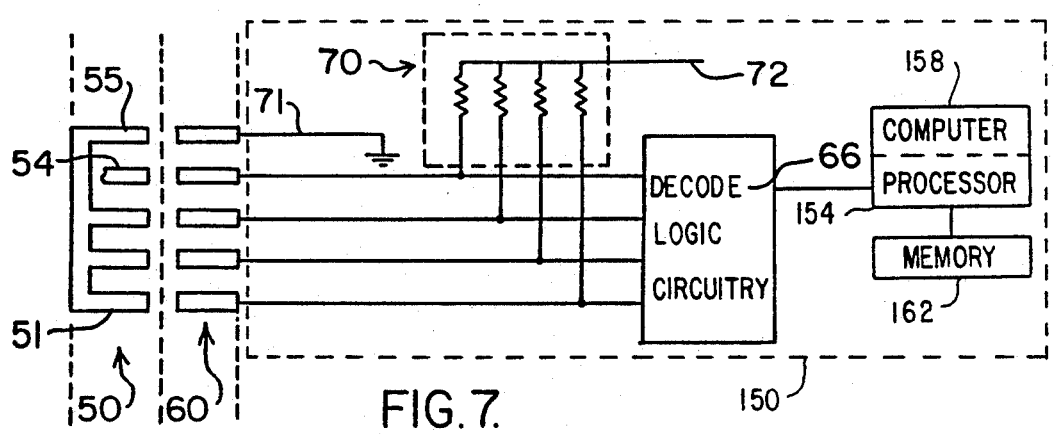
FIG. 7 is a diagram of an embodiment in accordance with this invention for identifying the adapter interface connector.

If pin 55 is considered a common bus and is connected to circuit common receiver 60 as shown in FIG. 7, then decode logic circuitry 66 can establish a voltage at the mating connector 60 by means of a resistor network 70 connected to the digital logic supply voltage 72. For this example, assume pin 51 represents the most significant bit and in sequence pin 54 represents the least significant bit. Thus the digital pattern 0001 is detectable at the mating connector 60 by the decode logic 66. The connector 50 configuration thereby allows detection of a total of 16 different identification codes or 32 if system ground (91 or 104) is used. The use of additional connector pins can substantially increase the number of available unique codes. If desired, it is possible to generate the digital or analog identification codes at the cellular phone or its connector. However, this requires circuit complexity and additional conductors through the cable which is avoided by incorporation of the code generation in the universal connector as described herein.

In a typical system configuration, a computer 158 is part of the host assembly although hard wired control units or other combinations of electronic elements are acceptable. The control unit or computer stores a series of blocks of data in a memory 162 or other data storage device with each block containing the instructions necessary for controlling the universal connector interfacing circuits to operate through the universal connector into a particular type of cellular telephone. The blocks of data are each retrievable from the data storage device in accordance with the identification code presented to the computer on the universal connector. The controlling device uses the retrieved data to set up a compatible set of switches, voltage levels, signal paths, etc., at the host system universal connector interface to work with the kind of cellular telephone specified by the identification data. The system likewise is controlled to establish normal operations with the attached cellular telephone thereafter. The system is ready to function whenever a cellular telephone is connected to one end of a cable with the other end attached to the host system universal connector input port.

In a typical operation, the decoding device in the host assembly 150 samples the universal connector 50 pin connections which are specified as the source of code signals for identification of the type of connector and/or telephone present on the other end of the cable. The processor does this by decoding the binary identification number from those pins. The processor actually identifies the type of phone via a table look-up operation. Once having determined the cellular phone type, the processor next establishes the necessary interfacing voltages, signal protocols and interconnections to allow the base unit to communicate with the phone in an appropriate manner compatible with the type of phone attached.

Figure 8:
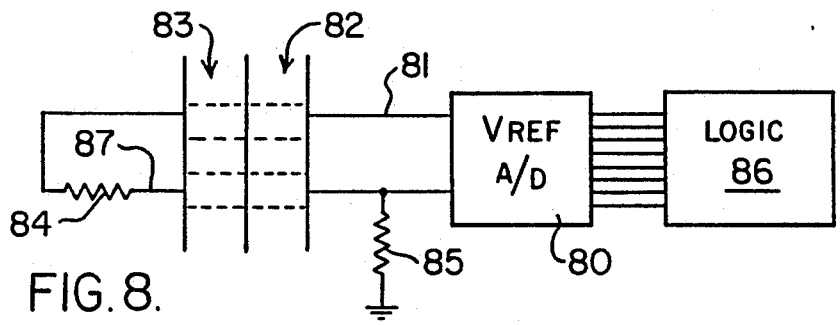
FIG. 8 is a partially schematic diagram of another embodiment of this invention for identifying the adapter cable by selectable resistor means.

Yet another embodiment for providing coding is shown in FIG. 8. In this embodiment, analog to digital (A/D) converter 80 provides a reference voltage (Vref) to line 81 which is presented to the mating connector pins 82 and 83. The voltage produces a current through the circuit consisting of resistor 84 (Rprog) and resistor 85 (Rfixed) in a half-bridge configuration providing a voltage at pin 87 which is connected to the signal input of A/D converter 80. A 6 bit A/D converter can provide 64 possible binary codes to logic 86. The value for each Rprog resistor 84 is calculated from the equation: Vout*Rfixed/(Vref−Vout). An example of this calculation is shown in appended Table 1 wherein Rprog is a list of programming resistor values which uniquely determine one of the 64 possible input voltages to the D/A converter 80 which result in distinct binary output codes. Rfixed is the half-bridge calibrating resistor 85 and Vref is present on line 81. In Table I, Vref is 5.0 volts, Rfix is 100k ohms, "Hex" is a hexadecimal address and the Rprog terms such as "1.43E+03" means a resistive value in ohms computed by 1.43 times 10 to the third power (or 1000).

Yet Another version of the previously discussed apparatus and methods is to use a plurality of programming resistors with one end connected in common to Vref and a like number of A/D converters. This can provide a large expansion in the number of identification bits or allow the use of less expensive A/D converters having fewer conversion bits.

While the exemplary preferred embodiments of the present invention are described herein with particularity, those having normal skill in the art will recognize various changes, modifications, additions and applications other than those specifically mentioned herein without departing from the spirit of this invention.

TABLE I

| Step | Hex | Rprog | Vout |
|---|---|---|---|
| For Vref = 5 and Rfix = 100000 | | | |
| 1 | 0 | 1.43E + 03 | 0.070 |
| 2 | 1 | 2.89E + 03 | 0.141 |
| 3 | 2 | 4.40E + 03 | 0.211 |
| 4 | 3 | 5.96E + 03 | 0.281 |
| 5 | 4 | 7.56E + 03 | 0.352 |
| 6 | 5 | 9.22E + 03 | 0.422 |
| 7 | 6 | 1.09E + 04 | 0.492 |
| 8 | 7 | 1.27E + 04 | 0.563 |
| 9 | 8 | 1.45E + 04 | 0.633 |
| 10 | 9 | 1.64E + 04 | 0.703 |
| 11 | A | 1.83E + 04 | 0.773 |
| 12 | B | 2.03E + 04 | 0.844 |
| 13 | C | 2.24E + 04 | 0.914 |
| 14 | D | 2.45E + 04 | 0.984 |
| 15 | E | 2.67E + 04 | 1.055 |
| 16 | F | 2.90E + 04 | 1.125 |
| 17 | 10 | 3.14E + 04 | 1.195 |
| 18 | 11 | 3.39E + 04 | 1.266 |
| 19 | 12 | 3.65E + 04 | 1.336 |
| 20 | 13 | 3.91E + 04 | 1.406 |
| 21 | 14 | 4.19E + 04 | 1.477 |
| 22 | 15 | 4.48E + 04 | 1.547 |
| 23 | 16 | 4.78E + 04 | 1.617 |
| 24 | 17 | 5.09E + 04 | 1.688 |
| 25 | 18 | 5.42E + 04 | 1.758 |
| 26 | 19 | 5.76E + 04 | 1.828 |
| 27 | 1A | 6.12E + 04 | 1.898 |
| 28 | 1B | 6.49E + 04 | 1.969 |
| 29 | 1C | 6.89E + 04 | 2.039 |
| 30 | 1D | 7.30E + 04 | 2.109 |
| 31 | 1E | 7.73E + 04 | 2.180 |
| 32 | 1F | 8.18E + 04 | 2.250 |
| 33 | 20 | 8.66E + 04 | 2.320 |
| 34 | 21 | 9.16E + 04 | 2.391 |
| 35 | 22 | 9.69E + 04 | 2.461 |
| 36 | 23 | 1.03E + 05 | 2.531 |
| 37 | 24 | 1.08E + 05 | 2.602 |
| 38 | 25 | 1.15E + 05 | 2.672 |
| 39 | 26 | 1.21E + 05 | 2.742 |
| 40 | 27 | 1.29E + 05 | 2.813 |
| 41 | 28 | 1.36E + 05 | 2.883 |
| 42 | 29 | 1.44E + 05 | 2.953 |
| 43 | 2A | 1.53E + 05 | 3.023 |
| 44 | 2B | 1.62E + 05 | 3.094 |
| 45 | 2C | 1.72E + 05 | 3.164 |
| 46 | 2D | 1.83E + 05 | 3.234 |

TABLE I-continued

| Step | Hex | Rprog | Vout |
|---|---|---|---|
| For Vref = 5 and Rfix = 100000 | | | |
| 47 | 2E | 1.95E + 05 | 3.305 |
| 48 | 2F | 2.08E + 05 | 3.375 |
| 49 | 30 | 2.22E + 05 | 3.445 |
| 50 | 31 | 2.37E + 05 | 3.516 |
| 51 | 32 | 2.54E + 05 | 3.586 |
| 52 | 33 | 2.72E + 05 | 3.656 |
| 53 | 34 | 2.93E + 05 | 3.727 |
| 54 | 35 | 3.16E + 05 | 3.797 |
| 55 | 36 | 3.41E + 05 | 3.867 |
| 56 | 37 | 3.71E + 05 | 3.938 |
| 57 | 38 | 4.04E + 05 | 4.008 |
| 58 | 39 | 4.42E + 05 | 4.078 |
| 59 | 3A | 4.87E + 05 | 4.148 |
| 60 | 3B | 5.40E + 05 | 4.219 |
| 61 | 3C | 6.03E + 05 | 4.289 |
| 62 | 3D | 6.80E + 05 | 4.359 |
| 63 | 3E | 7.77E + 05 | 4.430 |
| 64 | 3F | 9.00E + 05 | 4.500 |

What is claimed is:

1. Apparatus for providing universal interfacing with a cable having on a first end a multiple contact connector of a predetermined number of contacts in a predetermined configuration with at least one of the first end contacts for presenting a binary coded signal wherein the binary coded signal correlates to the identity of a particular type of cellular telephone and with a connector on the opposite end of the cable for attachment to a particular type of cellular telephone amongst a plurality of different types of cellular telephones comprising:

means connected to the binary coded signal connector contact for determining the type of cellular phone attached to the opposite end connector of the cable, said determining means including means retrievably storing a multiplicity of information groups with each said group selectable in accordance with said binary coded signal, each said information group containing information for controlling the cable first end connector for functionally operating with a particular one of a plurality of cellular phones, the first end cable connector including a plurality of contacts for use in establishing a connection with said determining means, said determining means including means for sampling said first end connector contacts for producing a binary signal identifying said group of information for selection; and means responsive to said determining means for enabling the cable first end connector contacts for performing functional operations with the cellular telephone attached to the cable, said determining means further including means responsive to a received coded signal for selecting said information group identified thereby from said storing means and for introducing said group to said enabling means.

2. A cable for use in conjunction with a control unit having a connector input arrayed in accordance with a first discipline with a control unit designed to interface with a cellular telephone which has a connector having a plurality of electrical contacts arrayed in a second discipline for operative connection of the control unit to a particular type of cellular telephone having a connector of the second discipline comprising:

a connector on one end of said cable having a plurality of electrical contacts thereon arrayed in accordance with said first discipline;

a second connector attached to the opposite end of the cable with a plurality of electrical conductors interconnecting respective contacts of said first connector with corresponding contacts in accordance with common functions between said first and second discipline; and means for establishing a connection at at least one contact of said first discipline connector, said means for establishing used in creating a signal, with said signal coded to identify the type of cellular telephone attached to said second discipline connector, said coded signal establishing means includes a predetermined group of said first discipline connector contacts and said predetermined group contacts are used in establishing said coded signal in a binary arrangement corresponding to the identity of the type of cellular phone attached to the cable.

3. Apparatus in accordance with claim 2 wherein said predetermined group of contacts are arranged for selective interrupting of the electrical conductivity of contacts within said group for establishing said binary code to identify the type of cellular telephone attached to said second discipline connector.

4. Apparatus for providing a universal interface with a hand held cellular telephone which has a battery that requires periodic recharging comprising:

cable means;

first connector means attached to one end of said cable means and including contact means for delivery battery charging power and for exchanging information bearing signals, and means to identify the make and model of the cellular telephone independently of the telephone, said means to identify connected to said contact means, said means to identify including means for producing a digital signal, said means for producing communicating with at least one contact of said first connector and, when said apparatus is connected to the cellular telephone, said means for producing produces a digital signal with a magnitude correlated to the identity of the cellular telephone and wherein said information exchanging contact means includes means for exchanging radio frequency, audio and digital signals;

second connector means attached to the opposite end of said cable and including contact means for allowing attachment to a predetermined one of a plurality of cellular telephone units; and a plurality of conductors interconnecting said first and second connector contact means having common functions;

whereby universal interface is establishable between a host assembly which provides signal processing features suitable for operating with a predetermined cellular telephone.

5. An apparatus for providing an interface between each one of a plurality of hand-held, battery powered cellular telephone and a host assembly in which each of the plurality of cellular telephones requires a different battery charging signal for charging the battery in each of the cellular telephones is a different arrangement of electrical connectors accessible on the exterior of each of the cellular telephones, comprising:

a plurality of cables including a first cable and a second cable, each of said plurality of cables including a plurality of conductors, a majority of said plurality of second cable conductors carrying signals between a second cellular telephone and a host assembly that are functionally equivalent to signals carried by said plurality of first cable conductors between a first cellular telephone and a host assembly, said first cable including a first conductor for carrying a first signal for charging a battery of the first cellular telephone, said second cable including a first conductor for carrying a second signal for charging a battery of the second cellular telephone and in which said second signal is different from said first signal;

a plurality of common connectors, including a first common connector and second common connector, each of said plurality of common connectors connected to one of said plurality of cables adjacent a first end thereof, said first common connector receiving said plurality of conductors of said first cable and said second common connector receiving said plurality of conductors of said second cable, said second common connector receiving said second cable conductors in the same physical position as said first common connector receives said first cable conductors, wherein each of said first and second cables is connected to equivalent host assemblies;

a plurality of cellular telephone connectors including a first cellular telephone connector and a second cellular telephone connector, each of said plurality of cellular telephone connectors connected to one of said plurality of cables adjacent a second end thereof, said first cellular telephone connector receiving said plurality of conductors of said first cable in a first physical position and said second cellular telephone connector receiving said plurality of conductors of said second cable in a second physical position different from said first physical position wherein said first cellular telephone connector is able to communicate with the first cellular telephone but not the second cellular telephone and said second cellular telephone connector is able to communicate with the second cellular telephone but not the first cellular telephone, and wherein at least one of said second cable conductors is transposed relative to a corresponding conductor of said first cable and in which said corresponding conductor of said first cable is carrying a signal functionally equivalent to said at least one conductor of said second cable; and means for identifying a cellular telephone that is connected to said first cellular telephone connector.

6. Apparatus in accordance with claim 5, wherein said means for identifying includes an analog signal having a magnitude corresponding to a predetermined type of cellular telephone, said means for identifying including means for converting the analog signal to a digital signal.

7. An apparatus, as claimed in claim 5, wherein:
said second signal has a voltage level different from said first signal.

8. An apparatus as claimed in claim 5, wherein:
said means for identifying being located remote from said first cellular telephone connector and more adjacent to said first common connector.

9. An apparatus, as claimed in claim 5, wherein:
said plurality of conductors of said first cable at said first cellular telephone connector are physically positioned in one of the following arrangements: cylindrical, rectangular, spring contact and pad type and said plurality of conductors of said second cable at said second cellular telephone connector are physically positioned in a different one of the following arrangements: cylindrical, rectangular, spring contact and pad type.

* * * * *